US009026097B2

(12) United States Patent  (10) Patent No.: US 9,026,097 B2
Lundsgaard et al.  (45) Date of Patent: May 5, 2015

(54) DEVICE AND METHOD FOR COMMUNICATION DEVICES

(71) Applicant: Symbol Technologies, Inc., Lincolnshire, IL (US)

(72) Inventors: Soren Lundsgaard, Inverness, IL (US); James Fagioli, Holtsville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 400 days.

(21) Appl. No.: 13/673,554

(22) Filed: Nov. 9, 2012

(65) Prior Publication Data

US 2014/0135059 A1  May 15, 2014

(51) Int. Cl.

| H04M 3/42 | (2006.01) |
| H04W 88/04 | (2009.01) |
| H04M 1/725 | (2006.01) |
| H04W 76/02 | (2009.01) |
| H04W 84/16 | (2009.01) |
| H04W 88/06 | (2009.01) |

(52) U.S. Cl.
CPC .......... *H04W 88/04* (2013.01); *H04M 1/72569* (2013.01); *H04W 76/023* (2013.01); *H04M 3/42314* (2013.01); *H04W 84/16* (2013.01); *H04W 88/06* (2013.01); *H04M 2250/66* (2013.01)

(58) Field of Classification Search
CPC ....................... H04M 3/42042; H04M 3/42025
USPC ............................................... 455/415, 552.1
See application file for complete search history.

(56) References Cited

U.S. PATENT DOCUMENTS

| 7,280,647 B2 | 10/2007 | Henderson |
| 7,929,955 B1 | 4/2011 | Bonner |
| 2008/0080688 A1 | 4/2008 | Burgan et al. |
| 2011/0197163 A1 | 8/2011 | Jegal et al. |
| 2012/0021730 A1 | 1/2012 | Vendrow |
| 2012/0196581 A1 | 8/2012 | Papakipos et al. |

OTHER PUBLICATIONS

Lundsgaard et al.,"Device and Method for Communications Applications in Shopper Assistance Applications", U.S. Appl. No. 13/673,366, filed Nov. 9, 2012, 23 pages.

*Primary Examiner* — Creighton Smith

(57) ABSTRACT

A method determines an operating mode for a first communications device to communicatively connect to a second communications device. The method includes transmitting, by a first communications device to a wireless services manager arrangement (WSMA), contact identification data associated with a second communications device. The method includes determining, by the WSMA, association data as a function of the contact identification data and a contact identification database. The method includes determining, by the WSMA, one of a plurality of operating modes for the first communications device as a function of the association data. The method includes communicatively connecting the first communications device with the second communications device utilizing the determined operating mode.

20 Claims, 2 Drawing Sheets ously been drawn to scale. For example, the dimensions of
DEVICE AND METHOD FOR COMMUNICATION DEVICES

FIELD OF THE DISCLOSURE

The invention relates to configuring a communications device having a dual mode to determine when a functionality related to a first mode is used so that the communications device operates in the first mode and determine when the functionality related to a second mode is used so that the communications device operates in the second mode.

BACKGROUND

A conventional communications device may be configured to be used for both personal and enterprise calls on a wide area network (WAN). Certain conventional communications devices are further configured with a switch to set the communications device to operate in a first operating mode for personal calls and a second operating mode for the enterprise calls. Accordingly, when the personal call is made with the communications device preset in the corresponding operating mode, the call being made goes directly to the WAN (e.g., normal cellular network). When the enterprise call is made with the communications device preset in the corresponding operating mode, the call being made goes to an enterprise network node such as a private branch exchange (PBX) so that the enterprise call functionalities may be accessed.

Currently, the switch for the conventional communications device must either be performed manually prior to a call being placed or be configured in a predetermined manner based upon known conditions that generally indicate which operating mode should be used. In the first case, the user is always required to place the communications device in the proper operating mode prior to each call being placed using the communications device. In the second case, a current configuration to set the communications device may be a time of day in which when a call is made from the communications device between a certain time (e.g., 8:30 am-5:00 pm), the enterprise mode is used. Outside the time window, the communications device may be set with the personal mode. Thus, the user may always be forced to utilize a particular operating mode such as always using the enterprise mode despite being a personal call during the predetermined time window.

Accordingly, there is a need for determining the operating mode of the communications device for each call being placed in a dynamic manner so that the correct operating mode is used.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
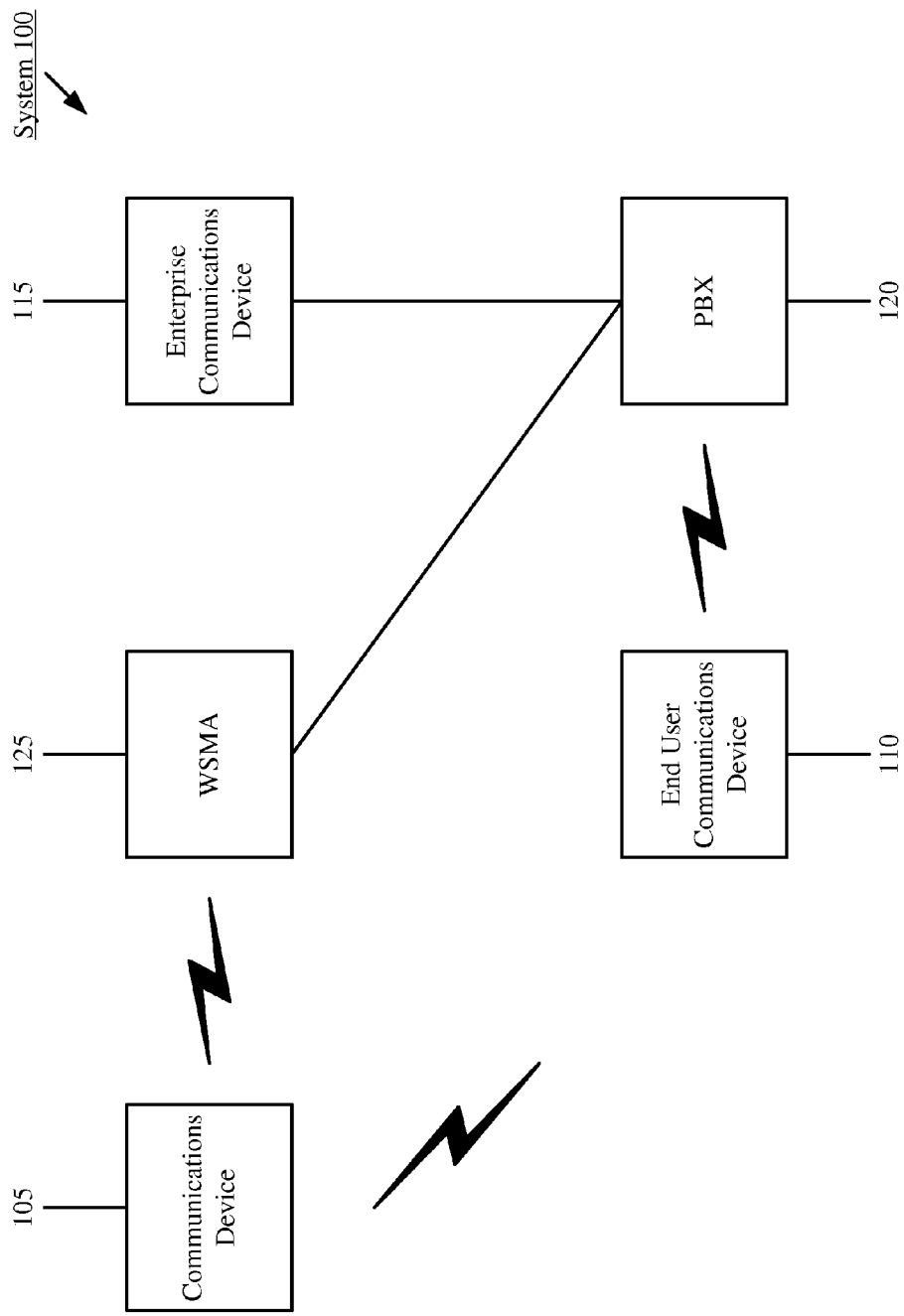
FIG. 1 illustrates a system for dynamically determining an operating mode for a communications device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a device and method for dynamically determining an operating mode for a communications device. The method comprises transmitting, by a first communications device to a wireless services manager arrangement (WSMA), contact identification data associated with a second communications device; determining, by the WSMA, association data as a function of the contact identification data and a contact identification database; determining, by the WSMA, one of a plurality of operating modes for the first communications device as a function of the association data; and communicatively connecting the first communications device with the second communications device utilizing the determined operating mode.

The exemplary embodiments may be further understood with reference to the following description and the appended drawings, wherein like elements are referred to with the same reference numerals. The exemplary embodiments describe a device and method for dynamically determining an operating mode for a communications device as a function of a contact identification data (e.g., phone number) being entered for a communications functionality. Specifically, with a dual operating mode communications device, a plurality of references such as contact identification databases (e.g., phone books) may be used to determine the type of call being made so that the correct operating mode may be set each time the communications functionality is used on the communications device. The operating modes, the communications device, the contact identification data, the contact identification database, the communications functionality, and a related method will be discussed in further detail below.

It should be noted that the exemplary embodiments of the present invention described below relate to a telephone call. However, the present invention may further relate to any communications functionality in which a first communications device may communicatively connect to a second communications device. Thus, the exemplary embodiments of the present invention may further relate to other communications functionalities such as Voice-Over-Internet-Protocol (VoIP) communications, email communications, text communications, instant message communications, etc.

FIG. 1 is a system 100 for dynamically determining an operating mode for a communications device 105 in accordance with some exemplary embodiments of the present invention. The system 100 relates to a pathway the communications device 105 utilizes to reach an end user communications device 110 as a function of an operating mode. The communications device 105 may operate in at least two different operating modes, an enterprise mode and a personal mode. However, it should be noted that the use of two operating modes is only exemplary. According to the exemplary embodiments of the present invention, further operating modes may be included so that the communications device 105 is configured to determine from a plurality of operating modes beyond two. The system 100 may also relate to a combination of various network configurations. For example, the communications device 105 may be configured to operate in a wide area network (WAN) utilizing conventional cellular functionalities such as a Public Switched Telephone Network (PSTN) or may also be configured to operate in a wireless local area network (WLAN) utilizing conventional wireless functionalities such as WiFi. As one of the operating modes of the communications device 105 is the enterprise mode, the system 100 may include a private branch exchange (PBX) 120. The PBX 120 may be for an enterprise having other communications devices communicatively connected thereto such as enterprise communications device 115. As will be explained in further detail below, the communications device 105 may further utilize a wireless services manager arrangement (WSMA) 125 in order to place a call in the enterprise mode.

The communications device 105 may be any electronic device configured to place a communications call to a further electronic device. Thus, the communications device 105 may be a portable device such as a mobile phone, a personal digital assistant, a smartphone, a tablet, a laptop, a barcode reader, etc. or a stationary device such as a desktop computer, a VoIP phone, etc. The communications device 105 may also be configured to operate in at least two different operating modes. Specifically, the communications device 105 may operate in an enterprise mode or a personal mode.

The communications device 105 may include a plurality of components (not shown). For example, the communications device 105 may include a processor, a memory, a display device, a transceiver, etc. The processor and memory may provide conventional functionalities for the communications device. According to the exemplary embodiments of the present invention, the processor may be configured to execute a calling functionality that transmits contact identification data to the WSMA 125 which determines the operating mode of the communications device 105 prior to communicatively connecting the communications device 105 to the end user communications device 110. The memory may also be configured to store the calling functionality locally on the communications device 105. The calling functionality may further have access to at least one contact database (e.g., phone book) stored on the memory of the communications device 105. Thus, the user of the communications device 105 may enter contact identification data by selecting a contact in the contact database. As will be evident below, the contact identification data may relate to an enterprise use or a personal use. The transceiver may enable the communications device 105 to be communicatively connected to the end user communications device 110 via a WAN connection (when in the personal operating mode) or a WLAN connection (when in the enterprise operating mode). The transceiver of the communications device 105 may be configured to exchange data with the WSMA 125 so that the operating mode may be set. Thus, the transceiver may transmit contact identification data that is received on the communications device 105 to the WSMA 125 to determine whether the contact identification data is associated with any of the contact identification databases of the enterprise. The WSMA 125 may subsequently transmit a response to the communications device 105 indicative of the operating mode to be used for the communications functionality.

The end user communications device 110 may be substantially similar to the communications device 105. Specifically, the end user communications device 110 may be any electronic device configured to receive a communications call from a further electronic device. The end user communications device 110 may also be any portable or stationary electronic device. The end user communications device 110 may also include a processor, a memory, a display device, a transceiver, etc. The display device may be configured to show an identity of a user for an incoming call. Accordingly, the transceiver may establish a communications link between the communications device 105 and the end user communications device 110 if the call is accepted as well as receive identity data of the user of the communications device 105 upon the call reaching the end user communications device 110 so that a caller identification is shown on the display device. It should be noted that the end user communications device 110 is not required to be configured to operate in more than one operating mode.

The enterprise communications device 115 may also be substantially similar to the communications device 105. In contrast to the communications device 105, the enterprise communications device 115 may be configured to operate in the enterprise operating mode only. Accordingly, the enterprise communications device 115 may not include hardware and/or software to enable a WAN connection to be established with the end user communications device 110 but must operate through the PBX 120.

The PBX 120 may be a telephone exchange that serves a particular business, office, or enterprise. The PBX 120 may make connections among the internal telephones of the enterprise and also connect them to the PSTN via trunk lines or to the end user communications device 110 via the WLAN. The WSMA 125 may be an intermediary network node in which the communications device 105 may establish a communicative link to reach the PBX 120. Specifically, when the communications device 105 operates in the enterprise operating mode, the communications device 105 may transmit data to the WSMA 125 which forwards the data to the PBX 120. The WSMA 125 may further be configured to receive the contact identification data of the end user communications device 110 from the communications device 105, determine association data of the contact identification data with a comparison to a contact identification database, and determine the operating mode of the communications device 105 as a function of the association data. The WSMA 125 may have access to the contact identification database which may be a list of contacts and respective contact identification data (e.g., phone number) or corresponding encrypted values (e.g., hash values). According to the exemplary embodiments of the present invention, the WSMA 125 may store the contact identification database in a network database relating to a plurality of end user communications devices so that the enterprise operating mode is used. Thus, the contact identification database may include contacts and phone numbers/encrypted values that are related to the enterprise.

According to the exemplary embodiments of the present invention, the communications device 105 is configured to dynamically utilize a pathway for a call to be performed as a function of the operating mode based upon the end user communications device 110. As discussed above, the pathway may be a function of the operating mode which is determined by the WSMA 125. The WSMA 125 may reference the contact identification database to determine whether the contact identification data transmitted from the communications device 105 is included in the contact identification database. Accordingly, the WSMA 125 may generate association data that is indicative of whether the enterprise mode is to be used by the communications device 105 to communicatively connect to the end user communications device 110 or whether the personal mode is to be used. The contact identification database may generally relate to any set of contacts and/or corresponding contact identification data or encoded values.

The contact identification database may also be updated by the enterprise to include any contact identification data related directly or indirectly to the enterprise itself. For example, a direct relationship to the enterprise may be to any communications device that is part of the enterprise such as devices used by employees of the enterprise. An indirect relationship to the enterprise may be to any communications device that is associated with the enterprise such as further organizations that work with the enterprise.

When a user places a call, the user may initially select a contact database or list of contacts in which the desired end user is included. Upon selecting the contact identification database, the user may then find the desired end user and initiate the call. The calling functionality may transmit the contact identification data to the WSMA 125. The WSMA 125 may compare the contact identification data to the list of contacts of the contact identification database stored in a network database. If a match results or a positive result is determined, the WSMA 125 may generate association data that indicates that the contact identification data that was transmitted is related to an enterprise use. However, if a match does not result or a negative result is determined, the WSMA 125 may generate association data that indicates that the contact identification data that was transmitted is related to a personal use. Accordingly, the WSMA 125 may transmit a reply to the communications device 105 indicative of the operating mode to be used. For example, a simple Boolean value may be transmitted in which a true value relates to an enterprise use while a false value relates to a personal use. Once the communications device 105 receives the reply, the communications device 105 may set the operating mode accordingly. With the personal operating mode, the communications device 105 utilizes its WAN functionalities to place the call to the end user communications device 110. With the enterprise operating mode, the communications device 105 transmits data to the WSMA 125 which forwards the data to the PBX 120 that connects the communications device 105 with the end user communications device 110. The enterprise operating mode may further be configured so that the communications device 105 transmits data directly to the PBX 120 that connects the communications device 105 with the end user communications device 110.

The result of the pathway determination enables the communications device 105 to dynamically and correctly have proper identification data associated therewith. Thus, in the enterprise operating mode, the identification of the user of the communications device 105 may correctly be displayed with known enterprise information. In the personal operating mode, the identification of the user of the communications device 105 may correctly be displayed with personal information. For example, a caller identification which is shown on the end user communications device 110 may show the identity of the user of the communications device 105 as the name and personal phone number of the user when the personal operating mode is used but may further show the name, enterprise phone number, title of the user, etc. associated with the enterprise. Although the user utilizes the communications device 105 having a single known phone number associated therewith, a different caller identification may be displayed on the end user communications device 110 through the WSMA 125 and the PBX 120. Therefore, despite the communications device 105 being a personal mobile unit (e.g., a bring-your-own-device for the enterprise), a communications call performed thereon for an enterprise purpose in which the end user communications device 110 is a known enterprise user may result in enterprise information for the user of the communications device 105 being displayed.

It should be noted that the manner in which the user of the communications device 105 entering the contact identification data may be of any type. For example, the calling functionality may be configured to determine the call pathway from other forms of placing the call such as a manual entry a phone number, a selection from a call history, a selection from a contact database, etc. The calling functionality may simply transmit the contact identification data to the WSMA 125 for the determination of the operating mode. The WSMA 125 is only required to generate the association data so that the association data is ultimately used to determine the operating mode for the communications call to be performed.

According to a preferred exemplary embodiment of the present invention, the communications device 105 may be configured with a cryptographic hash functionality to generate an encoded hash value for the contact identification data that is transmitted to the WSMA 125. That is, the encoded hash value representative of the contact identification data is transmitted from the communications device 105 to the WSMA 125. The contact data included in the contact identification database may also be stored as encoded hash values using the same cryptographic hash functionality. Accordingly, the WSMA 125 may compare the encoded hash value representative of the contact identification data to the hash values of the contact identification database. The comparison and resulting process by the WSMA 125 to determine the operating mode may be performed in a substantially similar manner as discussed above with the exception that the encoded hash values are used. In this manner, user privacy may be ensured when related to contact identification data that is for personal use. For example, personal calls may be confidential (e.g., lawyer, doctor, clergyman, etc.) and the contact identification data used to communicatively connect the communications device 105 to the end user communications device 110 may also be confidential as an encrypted data string is used. In contrast, enterprise contact identification data will have corresponding hash values that are already stored in the contact identification database.

Figure 2:
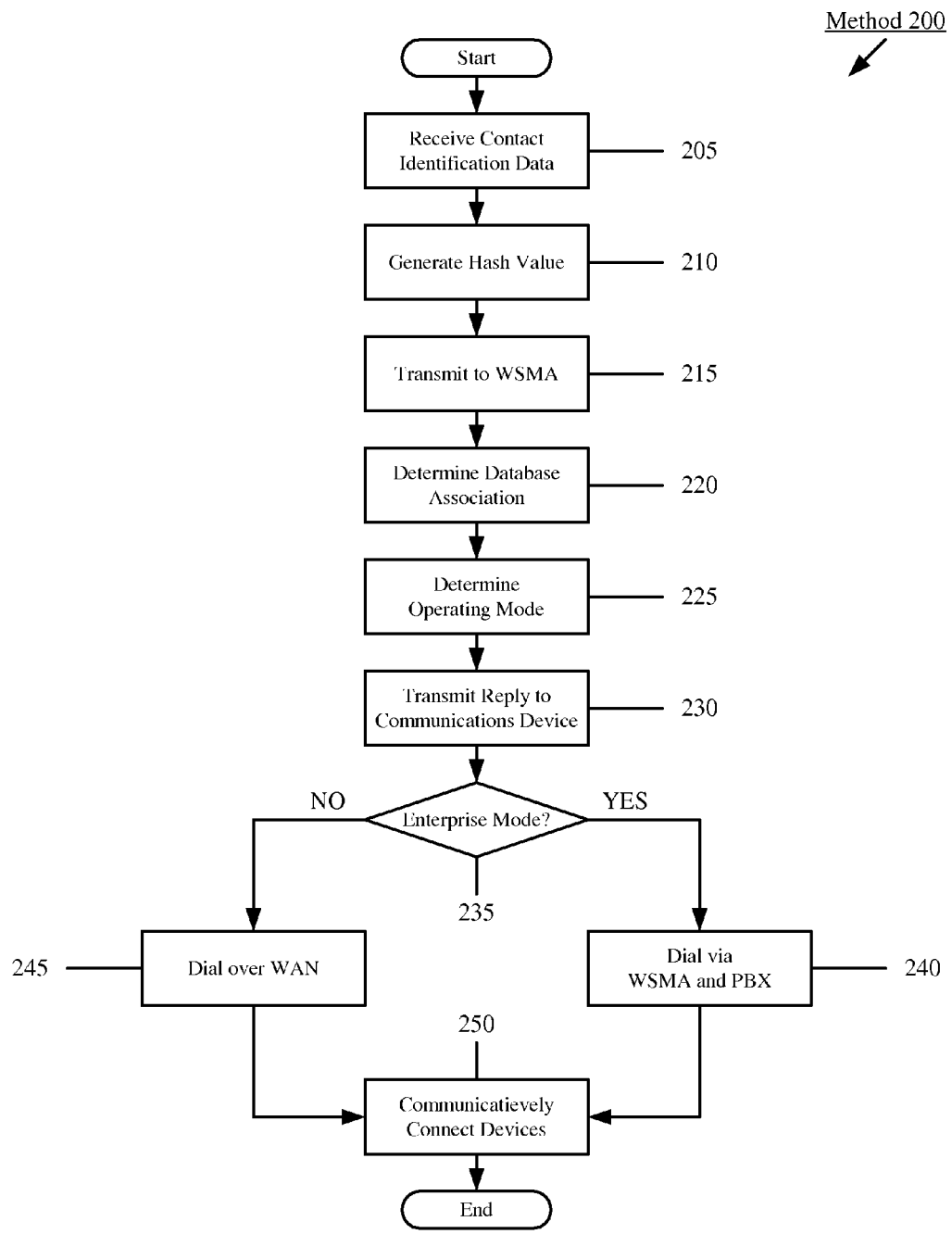
FIG. 2 illustrates a flowchart of a method for determining an operating mode for a communications device in accordance with some embodiments.

FIG. 2 is a flowchart of a method 200 for determining an operating mode for a communications device 105 in accordance with some exemplary embodiments of the present invention. Specifically, the communications device 105 may operate in at least two operating modes and a dynamic determination may be made for each time a call is performed thereon by the WSMA 125. The method 200 will be described with reference to the system 100 of FIG. 1.

In step 205, the contact identification data is received on the communications device 105. As discussed above, the contact identification data may be received on the communications device 105 in any variety of manners such as a manual entry, a selection from a contact database (e.g., phone book), a selection from a caller history, etc. As discussed above in a preferred exemplary embodiment, the contact identification data may be encoded with a cryptographic hash functionality. Thus, in step 210, the hash value is generated representative of the contact identification data as a function thereof. Via the transceiver of the communications device 105, in step 215, the hash value is transmitted from the communications device 105 to the WSMA 125. In step 220, the WSMA 125 determines the database association or association data of whether the hash value is included in the hash values stored in the contact identification database. In step 225, the WSMA 125 determines the operating mode as a function of the association data. For example, a true response from the comparison between the hash values may indicate that the enterprise mode should be used while a false response indicates that the personal mode should be used. In step 230, the WSMA 125 transmits the reply to the communications device 105 indicative of the operating mode to be used for the communications functionality.

In step 235, the calling functionality of the communications device 105 determines whether the enterprise operating mode is required as a function of the reply received from the WSMA 125. If the enterprise operating mode is required, the method 200 continues to step 240 where the call is performed using the WSMA 125 and the PBX 120 (or just the PBX 120). If the personal operating mode is required, the method 200 continues to step 245 where the call is performed over WAN. Subsequently, after step 240 or 245, the method continues to step 250 where the communications device 105 is communicatively connected to the end user communications device 110.

It should be noted that the use of the hash functionality is only exemplary. Thus, the method 200 may exclude step 210 when the hash functionality is not used. In such an embodiment, the communications device 105 may transmit the data directly corresponding to the contact identification data to the WSMA 125. Accordingly, each subsequent step may include utilizing the contact identification data to determine the operating mode rather than the encoded hash value.

The exemplary embodiments of the present invention provide a device and method for determining an operating mode of a communications device to perform a communications call to an end user communications device. The operating mode determines a pathway for the communications call to be made. In a first example, a first operating mode enables the communications call to the end user communications device to be performed by the communications device over a WAN. Accordingly, the first operating mode may be for personal use. In a second example, a second operating mode enables the communications call to the end user communications device to be performed by the communications device initially to a WSMA that forwards data to a PBX that further connects the devices. Accordingly, the second operating mode may be for an enterprise use. In this manner, an identification of the user may be dynamically determined for the end user communications device as a function of the operating mode. Thus, a common device may be used for both operating modes but different identification data of the user of the communications device may be shown to the end user communications device. Contact identification data may be transmitted from the communications device to a WSMA which determines association data indicative of the operating mode to be used. Upon receiving the reply from the WSMA, the communications device may set the operating mode for the communications functionality. Furthermore, in a preferred embodiment, to protect the privacy of the user when related to personal use, the contact identification data may be encoded so that hash values are used for the WSMA to determine the operating mode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
    transmitting, by a first communications device to a wireless services manager arrangement (WSMA), contact identification data associated with a second communications device;
    determining, by the WSMA, association data as a function of the contact identification data and a contact identification database;
    determining, by the WSMA, one of a plurality of operating modes for the first communications device as a function of the association data;
    communicatively connecting the first communications device with the second communications device utilizing the determined operating mode; and
    customizing a caller identification of the first communication device which is received at the second communication device based on the determined operating mode.

2. The method of claim 1, wherein a first operating mode of the operating modes is an enterprise operating mode and a second operating mode of the operating modes is a personal operating mode.

3. The method of claim 2, wherein the operating mode is indicative of a network pathway in which the first communications device communicatively connects with the second communications device.

4. The method of claim 3, wherein the network pathway for the enterprise operating mode is over a local area network (LAN).

5. The method of claim 3, wherein the network pathway for the personal operating mode is over a wide area network (WAN).

6. The method of claim 1, wherein the contact identification data is one of a phone number, a Voice-Over-Internet-Protocol (VoIP) number, an email address, a text message, and an instant message.

7. The method of claim 1, wherein the contact identification data is one of selected from a contact database stored on the first communications device and manually entered with an input device of the first communications device.

8. The method of claim 1, wherein the contact identification database includes a plurality of enterprise hash values, each enterprise hash value corresponding to a respective enterprise contact identity.

9. The method of claim 8, further comprising:
    encoding, by the first communications device, the contact identification data to generate a hash value,
    wherein the first communications device transmits the hash value corresponding to the contact identification data to the WSMA, and
    wherein the determining, by the WSMA, of the operating mode is a comparison between the hash value to the enterprise hash values.

10. The method of claim 1, wherein the contact identification database is stored on an enterprise network database.

11. A wireless services manager arrangement, comprising:
    a transceiver configured to receive contact identification data from a first communications device that is associated with a second communications device; and
    a processor configured to determine association data as a function of the contact identification data and a contact identification database, the processor configured to determine one of a plurality of operating modes for the first communications device as a function of the association data,
    wherein the transceiver is configured to transmit a response indicative of the determined operating mode to the first communications device so that the first communications device communicatively connects with the second communications device utilizing the determined operating mode and customizes a caller identification received at the second communication device based on the determined operating mode.

12. The wireless services manager arrangement of claim 11, wherein a first operating mode of the operating modes is an enterprise operating mode and a second operating mode of the operating modes is a personal operating mode.

13. The wireless services manager arrangement of claim 12, wherein the operating mode is indicative of a network pathway in which the first communications device communicatively connects with the second communications device.

14. The wireless services manager arrangement of claim 13, wherein the network pathway for the enterprise operating mode is over a LAN.

15. The wireless services manager arrangement of claim 13, wherein the network pathway for the personal operating mode is over a WAN.

16. The wireless services manager arrangement of claim 11, wherein the contact identification data is one of a phone number, a VoIP number, an email address, a text message, and an instant message.

17. The wireless services manager arrangement of claim 11, wherein the contact identification data is one of selected from a contact database stored on the first communications device and manually entered with an input device of the first communications device.

18. The wireless services manager arrangement of claim 11, wherein the contact identification database includes a plurality of enterprise hash values, each enterprise hash value corresponding to a respective enterprise contact identity.

19. The wireless services manager arrangement of claim 18, wherein the transceiver receives a hash value of the contact identification data encoded and generated by the first communications device so that the determining of the operating mode is a comparison between the hash value to the enterprise hash values.

20. A non-transitory computer readable storage medium including a set of instructions executable by a processor, the set of instructions operable to:
    transmit, by a first communications device to a WSMA, contact identification data associated with a second communications device;
    determine, by the WSMA, association data as a function of the contact identification data and a contact identification database;

determine, by the WSMA, one of a plurality of operating modes for the first communications device as a function of the association data;

communicatively connect the first communications device with the second communications device utilizing the determined operating mode; and customizing a caller identification of the first communication device which is received at the second communication device based on the determined operating mode.

* * * * *